Patented Aug. 19, 1924.

1,505,162

UNITED STATES PATENT OFFICE.

EUGEN NOWAK, OF BERLIN, GERMANY.

VEHICLE OF CONTACT.

No Drawing. Application filed August 29, 1921. Serial No. 496,658.

*To all whom it may concern:*

Be it known that I, EUGEN NOWAK, a citizen of Germany, residing at Berlin, Germany, have invented certain new and useful Improvements in Vehicles of Contact (for which I have filed an application in Germany, May 3, 1915, Patent No. 371,415), of which the following is a specification.

My invention relates to vehicles of contact for catalytic reactions. The vehicles act on gases in order to produce heat or to ignite the gases.

The efficiency of such vehicles of contact is substantially determined by the active surface and the concentration of the contact substance. The greater the surface of the contact substance which is spread on a carrier, for instance platinum black, the greater are the quantities of gases or liquids which can be catalyzed in the unit of time. The distribution of the contact substance over large surfaces, however, is limited by the fact that its ability of reaction, that is its ability of starting the catalytic reaction, rapidly decreases with decreasing concentration of the contact substance so that the reaction must be maintained by heat supplied from the outside. The catalytic action of the vehicle, however, is the more reliable the more concentrated is the solution of platinum salt with which the porous carrier is impregnated. Such concentrated vehicles of contact are also able to resist the influence of high temperatures and atmospheric influences, such as air containing water, ammonia, sulphuretted hydrogen, etc.

Such contact vehicles however, which combine high concentration with a large effective surface so that they not only act strongly catalyzing but also allow great quantities of substance to be treated in a short time, cannot be universally used, as the catalytic substances, platinum, palladium, etc., are very expensive.

According to my invention it is possible to obtain reliable and energetic catalytic action without using great quantities of expensive catalyzers and without supplying heat from the outside. This is effected as follows: Vehicles of contact of great mass which are diluted and therefore cheap but the catalytic action of which is small or nil, are combined with contact vehicles of high catalytic action of small mass which, on account of their smallness, are comparatively not expensive. In this combination, the small and cencentrated vehicle only starts the reaction, an effect which is comparable to ignition, but at the same time heats the large diluted mass by the heat formed in the body itself as well as in the reaction mixture so that it now becomes sufficiently active to entertain and complete the reaction which has been started.

The diluted mass, that is the mass containing too little of the active catalytic substance on the unit of surface, is activated by the concentrated mass resulting in a considerable saving in the catalyzer, for instance platinum. A very small mass of high concentration is sufficient for activating a very great mass of small concentration to such an extent that it is able to complete the catalytic reaction. Consequently, the quantity of the reacting substance in relation to the quantity of the catalyzer is considerably increased, much time being saved and the appartaus being better utilized.

The use of my improved vehicle of contact is the same as that of the well known platinum pills. In consequence, the vehicle must have various forms according to the purpose for which it is used. In igniting and heating devices, for instance, a very small igniting pill of high concentration may be combined with a larger but much less concentrated pill, or several pills of gradually decreasing concentration may be combined with a small concentrated pill.

In carrying out my invention I may proceed for instance, substantially as in the case of producing igniting pills and the like. I first prepare an igniting body, pill or the like by saturating a large amount of a suitable carrier, such as meerschaum, asbestos, pumice stone or the like with a comparatively small amount of a solution of a suitable platinum salt, or with a comparatively weak solution thereof, and then precipitate the platinum therefrom upon and within the carrier in the usual manner. This constitutes the dilute and catalytically slow vehicles. I then prepare another smaller catalytic body from a comparatively very small amount of such carrier, upon which a small amount of platinum is deposited, so that the second body represents the highly concentrated form of the catalyst.

Both bodies are then mechanically combined and placed in contact with each other. The high heat produced by the action of the concentrated body upon the chemical agent to be treated raises the activity of the diluted body to an extent far in excess of its amount of catalyst.

In order to continuously perform catalytic reactions, contact masses of different concentration may be so arranged in the vessels, chambers, passages, towers, etc., through which are conducted the substances to be submitted to the reaction, that the substances at first meet with contact masses the concentration of which is sufficiently high to start the catalytic reaction in them while the contact masses, which are combined with them, are not able to start the reaction but, after they have become catalytically active by increase of temperature, are able to entertain the reaction so that the reaction is continued and completed in the substances conducted past the vehicle. In and between the several contact masses, intermediate vehicles of various concentration and size may be arranged in order to intensify the reactive energy when it has been reduced.

I claim:

1. The process of producing a catalytic substance, which consists in forming a catalyst diluted by catalytically inert masses, and adding locally to such masses a comparatively small amount of a highly concentrated catalyst.

2. The process of producing a catalytic substance which consists in forming a catalyst diluted by an excess of catalytically inert substances, and adding locally thereto a small amount of said catalyst in a substantially undiluted highly concentrated condition.

3. The process of producing a catalytic substance which consists in depositing catalytically active finely divided platinum metal in the presence of a great excess of catalytically inert matter, and adding locally thereto a small amount of highly concentrated finely distributed platinum metal.

4. A catalytic substance comprising a mixture of a large excess of catalytically inactive matter with a catalyst deposited therein, and a body of highly concentrated catalyst in contact with said mixture.

5. A catalytic igniting pill, comprising a comparatively large amount of catalytically inert mass, a small amount of catalyst distributed in such mass, and a comparatively small body of catalytically inert substance with a deposit of highly concentrated catalytic substance in contact with such mass.

In testimony whereof I affix my signature.

EUGEN NOWAK.